US006973868B2

(12) United States Patent
Schneider et al.

(10) Patent No.: US 6,973,868 B2
(45) Date of Patent: Dec. 13, 2005

(54) DRY-RUNNING PISTON COMPRESSOR (CRANKSHAFT DRIVE LUBRICATION)

(75) Inventors: Klaus-Michael Schneider, Markt Indersdorf (DE); Michael Hartl, Unterhaching (DE)

(73) Assignee: Knorr-Bremse Systeme Für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/469,080

(22) PCT Filed: Feb. 26, 2002

(86) PCT No.: PCT/EP02/02041

§ 371 (c)(1),
(2), (4) Date: Dec. 12, 2003

(87) PCT Pub. No.: WO02/068822

PCT Pub. Date: Sep. 6, 2002

(65) Prior Publication Data

US 2004/0089147 A1 May 13, 2004

(30) Foreign Application Priority Data

Feb. 28, 2001 (DE) ................................ 101 09 514

(51) Int. Cl.[7] ................................ F01B 31/10
(52) U.S. Cl. ................................ 92/156; 74/605
(58) Field of Search ................................ 92/153, 156, 157; 74/605

(56) References Cited

U.S. PATENT DOCUMENTS 2,005,028 A * 6/1935 Eynon ........................ 74/587
2,288,596 A 7/1942 Pierce, Jr.
2,417,197 A 3/1947 Hewitt et al.
4,529,365 A 7/1985 Schutt et al.
5,195,420 A * 3/1993 Wanner ........................ 92/72
5,683,171 A * 11/1997 Van Gennep ............... 362/191
6,068,164 A * 5/2000 Totaro ........................ 222/389

FOREIGN PATENT DOCUMENTS

| | | |
|---|---|---|
| DE | 30 32 518 C2 | 5/1982 |
| DE | 37 10 071 A1 | 10/1987 |
| DE | 198 52 743 A1 | 5/2000 |
| DE | 200 00 492 U1 | 12/2000 |
| EP | 2000-18235 | 1/2000 |
| EP | 2001-165047 | 6/2001 |

* cited by examiner

*Primary Examiner*—Edward K. Look
*Assistant Examiner*—Devin Hanan
(74) *Attorney, Agent, or Firm*—Barnes & Thornburg LLP

(57) ABSTRACT

The invention relates to a dry-running piston compressor, in particular for rail vehicles. Said compressor comprises a crankcase (3) for a crankshaft (15) that is rotatably mounted in said crankcase, the latter being provided with at least one pot-type cylinder **(4*a*–4*c*) comprising a corresponding internal piston (12*a*, 12*e*). According to the invention, the crankshaft (15) is connected to one end of a connecting rod (14*a*, 14*c*) by means of a connecting rod hearing (16), which forms the first hearing point, in order to convert the rotational displacement into a linear displacement for the piston (12*a*, 12*c*) that is mounted at the other end of the connecting rod (14*a*, 14*c*) by means of a piston pin bearing (17), which forms the second bearing point. At least one lubricating nipple (18*a*, 18*c*) is mounted on the exterior of each connecting rod (14*a*, 14*c*) for relubricating the bearing point(s). A corresponding internal lubrication channel (22) runs from said nipple and discharges onto the connecting rod (16) and/or onto the piston pin bearing (17)**.

9 Claims, 3 Drawing Sheets

DRY-RUNNING PISTON COMPRESSOR (CRANKSHAFT DRIVE LUBRICATION)

The invention relates to a dry-running piston compressor, particularly for rail vehicles, having a crankcase for a crankshaft rotatably mounted therein, on which crankcase at least one pot-type cylinder having an assigned internal piston is arranged, the crankshaft being connected by way of a connecting rod bearing as a first bearing point with one end of a connecting rod in order to convert the rotating movement in a linear movement for the piston mounted at the other end of the connecting rod by means of a piston pin bearing as the second bearing point.

Conventionally, a separate drive unit is fastened to such a piston compressor of the above-mentioned type for generating a rotating movement for the crankshaft. Usually, an electric motor or the like is used as the drive unit. The piston compressor, which so far is composed of the piston compressor and the drive unit is used, for example, in the vehicle field for generating compressed air which is required for the operation of vehicle-specific pressure medium aggregates—such as brakes or the like.

The piston compressors used in the vehicle field are conventionally subjected to a long continuous operation or to a frequent switching-on and switching-off, which, as a result of friction, leads to a high heat development. In this field of application, oil-lubricated piston compressors have therefore predominantly been used which, if required, have a sufficient dissipation of excessive heat by way of an oil cooling circuit for ensuring an always optimal operating temperature.

Recently, dry-running piston compressors have also been used in various industries. A dry-running piston compressor operates without lubricating oil situated in a housing. Instead, the lubrication at the piston running path is replaced by a particularly low-friction dynamic sealing arrangement. Furthermore, all rotating components are disposed in roller bearings. In this case, the encased roller bearings are provided with a temperature-stable long-lifetime grease filling. In the valve region, slidingly guided components are largely avoided. As a result of the sum of these measures, an oil lubrication in the piston compressor is not necessary. Consequently, for example, the risk of a fouling of the compressed air generated by the piston compressor can be excluded. Furthermore, as a result of the elimination of an oil circuit and of major additional compensating masses, a dry-running piston compressor can be constructed to be of a relatively light weight.

The present invention relating to a dry-running piston compressor can be used in very different cylinder arrangements at the crankcase, such as a V-arrangement or an arrangement in the manner of a in-line engine. Furthermore, the piston compressor can also be constructed in several stages with a low-pressure stage and at least one additional next high-pressure stage. In addition, a very different fastening to the vehicle is also possible, as, for example, hanging on the vehicle floor (underfloor), horizontally or vertically standing within the body of the vehicle (interior installation) or the like.

In the vehicle field, particularly in the case of rail vehicles, long running times and maintenance intervals of the piston compressor are required. Thus, a piston compressor used in the rail vehicle construction should not have to be overhauled until it has operated for at least 6 years, which corresponds to an average of approximately 12,000 operating hours. This aspect has so far stood in the way of the use of dry-running, that is, oil-free compressors in the vehicle field, because the grease use duration in the case of lifetime-lubricated roller bearings is not sufficient in the temperature range customary in compressors in order to survive these maintenance intervals without damage to the bearings. Even when the operating temperatures are lowered as a result of a multi-stage compression with an intermediate cooling, the lifetime of the grease will be limited. Furthermore, because of a poor accessibility within the crankcase, the regreasing of the bearing points presents problems. Another problem results from the fact that grease emerging during the regreasing may reach the cylinder running surfaces of the piston engine, which leads to increased wear at the dry-running piston rings and the piston coatings.

It is an object of the present invention to provide a long-life dry-running piston compressor in the case of which an optimal lubrication of the bearing points of the crankshaft drive is achieved in a simple manner.

Based on a dry-running piston compressor according to the preamble of claim 1, this object is achieved in connection with its characterizing features. Additional measures improving the invention are indicated in the dependent claims which follow.

The invention includes the technical teaching that, for the regreasing of the bearing points of the crankshaft drive, at least one lubricating nipple is mounted on the outside on each connecting rod, from which lubricating nipple, a corresponding internal lubricating duct extends which leads into the connecting rod bearing and/or into the crankshaft bearing.

The advantage of this solution, which can easily be implemented constructively, is the fact that now a meterable regreasing of the bearing points is possible which are permanently lubricated per se. It was found that a lubricating duct extending inside the connecting rod does not considerably impair the stability of the connecting rod in the operation. The lubricating nipple is to be placed at the connecting rod such that a good accessibility exists from the outside.

The crankcase is preferably provided with at least one closable opening by way of which, by means of a lubricating tool, a feeding of lubricating medium takes place to the lubricating nipples from the outside. In this case, the opening in the crankcase can be closed by means of a lid which is detachably fastened on the crankcase by means of a screwed connection.

In the case of this above-described arrangement, the regreasing can particularly advantageously take place manually by means of a metering press. A metering of the delivery quantity of lubricant can take place by way of a shut-off valve. A refilling of lubricant can be implemented by way of an exchangeable grease cartridge. The grease metering press can be driven electrically or can be operated manually by means of a lifting device.

Advantageously, a tube-shaped attachment is constructed on the lubricating tool for delivering the lubricant. Since the lubricating nipples are situated inside the crankcase, it may be advantageous to mount electrical illuminating devices on the lubricating tool for illuminating the regreasing area situated inside the ball housing.

It is particularly advantageous for the lubricating nipples to be arranged in the shaft area of the connecting rod because, in the case of this placement, a particularly good accessibility can be implemented by way of the opening in the crankcase. This particularly applies to an essentially horizontal arrangement of the crankshaft drives in the crankcase.

The lubricating duct starting out from the lubricating nipple can advantageously be produced in the form of a single passage bore which extends through the shaft and which is separated by means of a closing body into two partial ducts each assigned to a bearing point. In this case, a separate lubricating nipple is also assigned to each partial duct. The closing body is preferably constructed as a ball element which is pressed into the passage bore constructed in the manner of an offset bore in the area of the step. As an alternative, it is also conceivable to produce the lubricating duct in the form of two basic bores extending along the shaft, which basic bores each lead to a bearing point and to each of which a separate lubricating nipple is assigned. It is also advantageous for a grease collecting space to be provided in the connecting rod in the area of the connecting rod bearing and/or in the area of the crankshaft bearing, for storing lubricant. As a result, on the one hand, a supply of sufficient lubricant can be created for the bearing point to be supplied and, at the same time, an undesirable emerging of lubricant from the bearing area can be prevented.

Additional measures improving the invention are illustrated in detail in the following by the description of a preferred embodiment of the invention by means of the figures.

Figure 1:
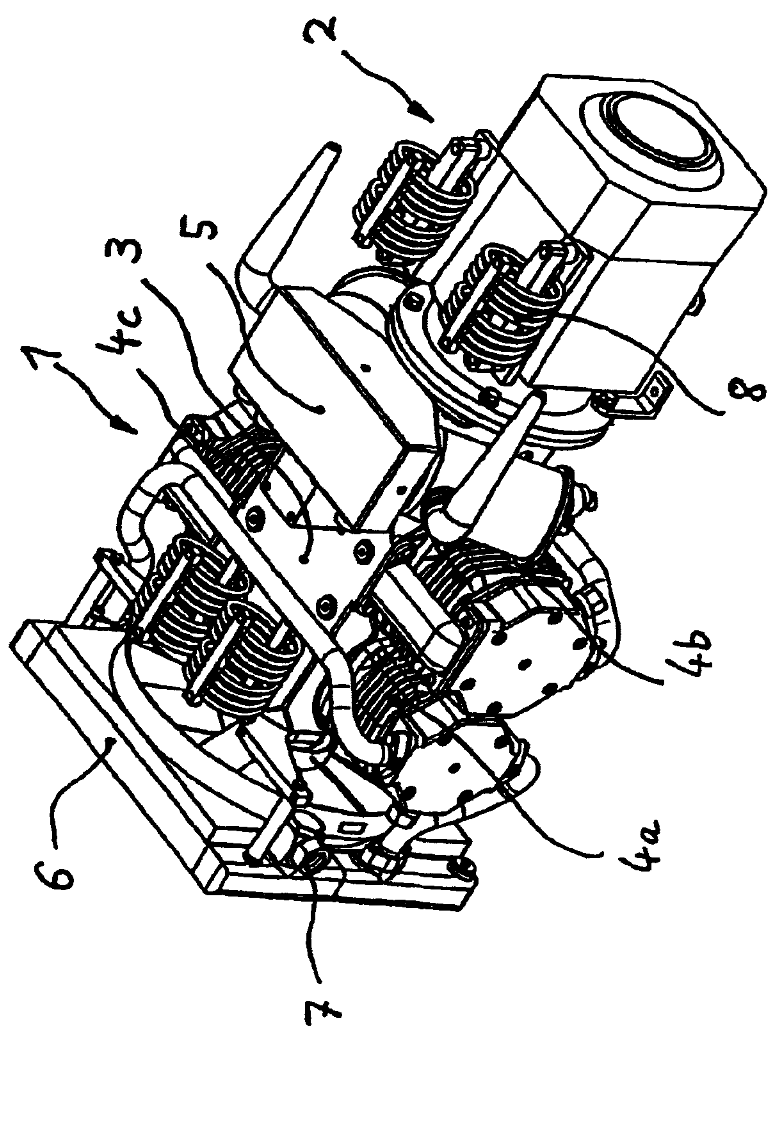
FIG. 1 is a perspective outside view of a dry-running piston compressor with the drive unit, which form a piston compressor used in the rail vehicle construction.

A dry-running piston compressor according to FIG. 1 essentially consists of a 2-stage compressor unit 1 with a flanged-on drive unit 2. The drive unit 2 is constructed as an electric motor and is detachably fastened to the crankcase 3 of the compressor unit 1 by means of a screwed connection. The drive unit 2 causes a crankshaft arranged in the crankcase 3 but not visible here to carry out a rotating movement which is converted to a stroke movement for pistons which are housed inside the pot-type cylinders 4*a*–4*c* fastened on the crankcase 3, for generating compressed air. By means of the piston stroke movement, air is taken in from the atmosphere by way of an input-side filter arrangement 5 and is compressed in stages inside the cylinders 4*a*–4*c*. The thus generated compressed air passes through a cooler arrangement 6 and is then available to the compressed-air system of a rail vehicle by way of the connection 7.

In this embodiment, the compressor unit 1 is constructed as a multi-stage piston compressor with a low-pressure stage and a high-pressure stage. The cylinders 4*b* and 4*c* are assigned to the low-pressure stage; the cylinder 4*a* is part of the high-pressure stage. All cylinders 4*a*–4*c* are arranged on the crankcase 3 of the compressor unit 1 in an opposed manner in a 180° V-construction. For fastening the compressor unit 1 with a flanged-on drive unit 2 to a carrier construction—not shown here in detail—of a rail vehicle, connecting devices 8 are provided.

Figure 2:
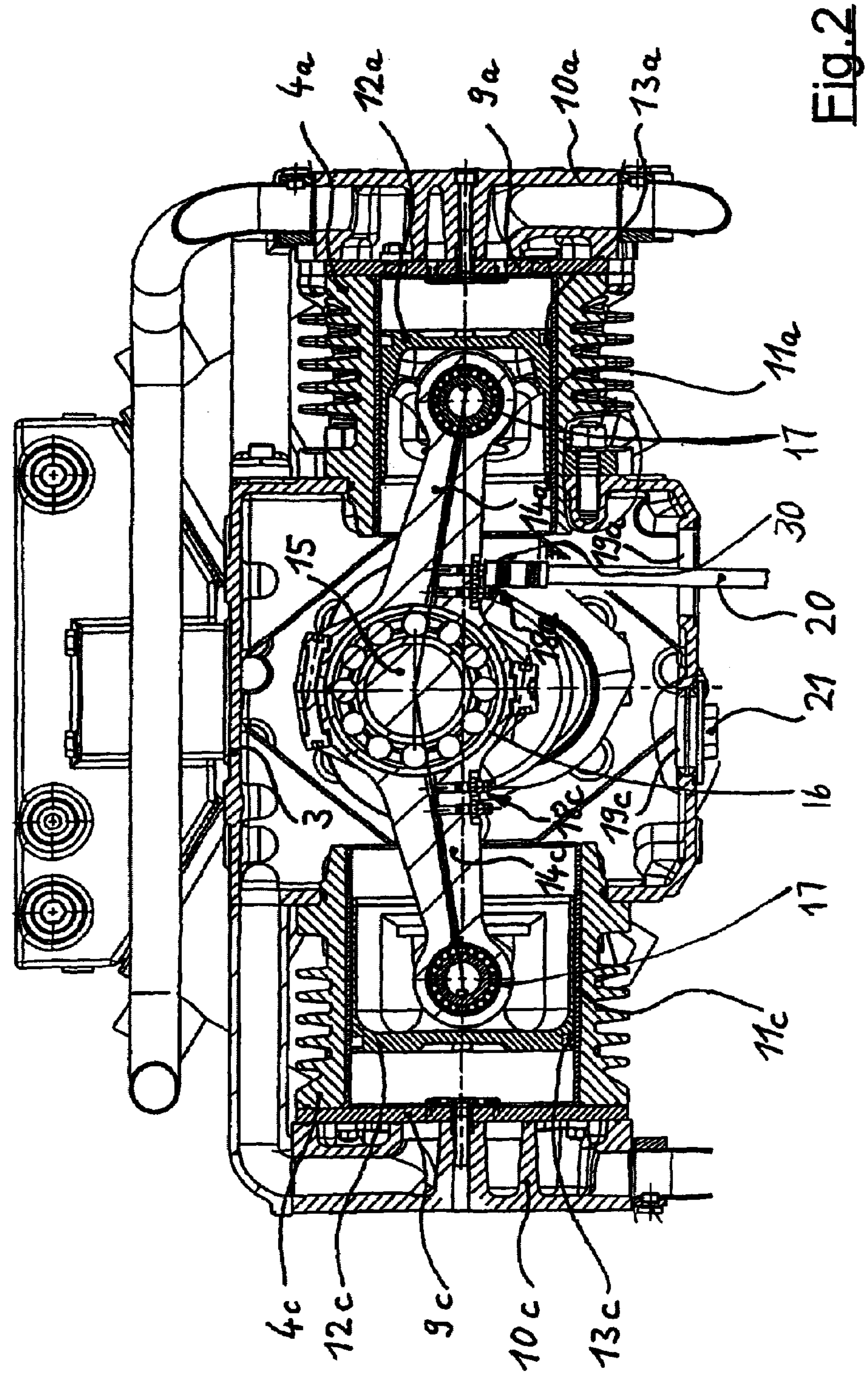
FIG. 2 is a longitudinal sectional view of a connecting rod of a crankcase of the piston compressor according to FIG. 1.

FIG. 2 is a view into the interior of the compressor unit 1, as an example, in the area of the opposed cylinders 4*a* and 4*c*. The cylinders 4*a* and 4*c* are each closed off on the face side by way of a valve plate 9*a* and 9*c* by means of one cylinder head 10*a* and 10*c* respectively. One cylinder liner 11*a* and 11*c* respectively made of a minimal-friction hard material is embedded in the cylinders 4*a* and 4*c*. In this cylinder liner 11*a* and 11*c* respectively, one piston 12*a* and 12*c* respectively is arranged which an be moved back and forth for generating compressed air. As the dynamic sealing device between the cylinder liner 11*a*, 11*c* and the assigned piston 12*a* and 12*c* respectively, a packing ring 13*a* and 13*c* respectively is provided within a groove-shaped recess on the upper edge area of the piston 12*a* and 12*c* respectively. The packing ring 13 and 13*c* also consists of a minimal-friction material. The linear drive of the pistons 12*a* and 12*c* takes place by way of a crank drive by means of connecting rods 14*a* and 14*c* respectively. On the side situated opposite the pistons 12*a* and 12*c*, the connecting rods 14*a* and 14*c* are connected with the crankshaft 15 by way of a connecting rod bearing 16. The piston-side fastening of the connecting rod 14*a*, 14*c* takes place by way of an assigned piston pin bearing 17. The connecting rod bearing 16 as well as the piston pin bearing 17 are constructed in the manner of a permanently lubricated roller body bearing.

For the regreasing of the two bearing points, two lubricating nipples 18*a*, 18*c* are in each case mounted on the outside of each connecting rod 14*a*, 14*c*. On the lower side, the crankcase 3 is provided with two openings 19*a*, 19*c* each assigned to a connecting rod 14*a* and 14*b*, by which openings 19*a*, 19*c*, by a lubricating tool 20, lubricant can be supplied to the lubricating nipples 18*a* and 18*c* from the outside. The openings 19*a* and 19*c* in the crankcase 3 can each be closed off by a lid 21, shown in opening 19*c*, which can be screwed in. An electrical illuminating device 30 may be provided on the lubricating tool 20. The lubricating tool may be a grease metering press.

Figure 3:
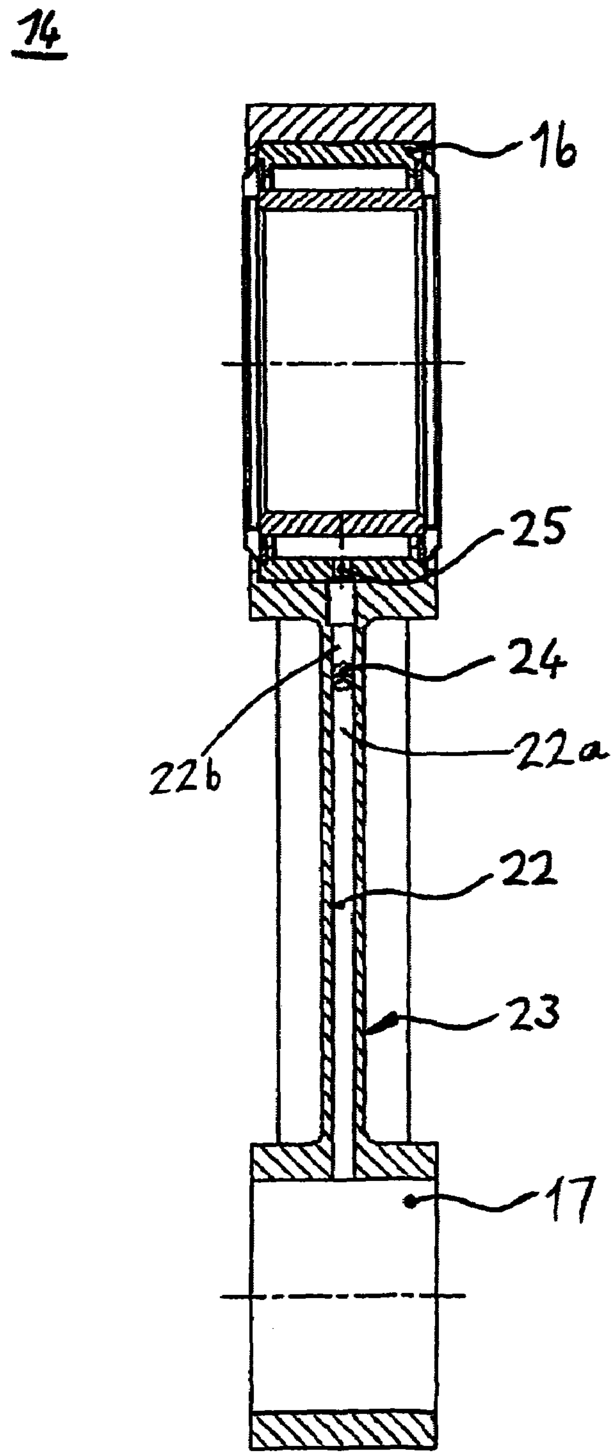
FIG. 3 is a cross-sectional view of the piston compressor according to FIG. 1 in the area of two opposite cylinders.

A lubricating duct 22 extends inside the connecting rod 14 illustrated in FIG. 3 as a component part. The lubricating duct 22 is constructed in the form of a single passage bore extending through the shaft 23 of the connecting rod 14. The passage bore is divided by a closing body 24 in the form of a ball element into two partial ducts 22*a*, 22*b* each assigned to a bearing point, a separate lubricating nipple—not shown here—being assigned to each partial duct. In this case, one partial duct leads to the piston pin bearing 17; the other partial duct is assigned to the connecting rod bearing 16. In order to ensure a supply of lubricant to the connecting rod bearing 16 as well as to the piston pin bearing 17, diverse breakthroughs 25 are provided, in the external rings of the connecting rod bearing 16 as well as of the piston pin bearing 17, which connect the partial ducts to the area of the roller bodies.

List of Reference Numbers

Connection 8 connection device 9 lubricating tool 21

What is claimed is:

1. A dry-running piston compressor comprising:

a crankshaft rotatably mounted in a crankcase;

a connecting rod connecting the crankshaft by a rod bearing to at least one piston by a piston pin bearing;

at least one lubricating nipple on the outside of the connecting rod;

at least one lubricating duct interior to the connecting rod connecting the lubricating nipple to one of the bearings;

the lubricating duct being a single passage bore which extends through a shaft of the connecting rod to both bearings and which is divided by a closing body into two partial ducts each assigned to a bearing; and a separate lubricating nipple is provided for each partial duct.

2. The dry-running piston compressor according to claim 1, wherein the crankcase includes at least one opening for providing access of a lubricating tool, from the outside, to the lubricating nipple.

3. The dry-running piston compressor according to claim 2, wherein the opening in the crankcase is closed off by a detachable lid.

4. The dry-running piston compressor according to claim 2 wherein the lubricating nipple is arranged in a shaft area of the connecting rod.

5. The dry-running piston compressor according to claim 1, wherein the passage bore is as an offset bore, in the area of a step; and a ball element is pressed in as the closing body.

6. The dry-running piston compressor according to claim 1, wherein the lubricating duct is constructed as two separate bores which extend along a shaft of the connecting rod to both bearings and a separate lubricating nipple is provided for each of the bores.

7. The dry-running piston compressor according to claim 1, including a grease collecting space, for storing lubricant, in the area of at least one of the bearings.

8. The dry-running piston compressor according to claim 1, combination with a manual lubricating tool constructed as a grease metering press.

9. The dry-running piston compressor according to claim 8, including an electrical illuminating device for illuminating a regreasing area situated inside the crankcase is mounted on the lubricating tool.

* * * * *